United States Patent [19]  
Schwalm

[11] 4,076,310  
[45] Feb. 28, 1978

[54] LIFT FOR TRUCK GATE
[76] Inventor: Howard G. Schwalm, 26697 Weld Co. Road #15, Loveland, Colo. 80537
[21] Appl. No.: 762,199
[22] Filed: Jan. 24, 1977
[51] Int. Cl.² .............................................. B60P 1/26
[52] U.S. Cl. ............................... 298/23 MD; 49/340; 296/57 R; 298/23 M
[58] Field of Search ............ 298/23 R, 23 MD, 23 M, 298/23 S, 23 D, 23 DF, 22 R, 18, 17.5, 17.6, 17.7, 7; 105/240, 263, 274, 275, 286, 308 P; 296/57 R; 49/340

[56] References Cited  
U.S. PATENT DOCUMENTS 3,284,950  11/1966  Grute ................................. 49/340 X  
3,773,385  11/1973  Sandberg ....................... 296/57 R X Primary Examiner—Frank E. Werner  
Attorney, Agent, or Firm—Frank C. Lowe; Horace B. Van Valkenburgh

[57] ABSTRACT

The invention is a lift for the gate of a truck, and especially a gate at the side of the truck. An L-shaped lift arm has base bars pivotally connected to an actuator mechanism beneath the bed of a truck. These arms swing to the side of the truck when extended and a lift bar on the base bars extends therefrom to engage the outside of a truck gate and the lift bar is angled from the base bars to push the gate upwardly to its closed position when the base bars are rotated to their extended position. The actuator mechanism includes two chain connected sprockets: a smaller sprocket at the base bar pivot and a larger sprocket connecting with the piston of a cylinder. The sprocket pitch diameter ratios are such that rotation of approximately 90° by the larger sprocket will effect an 180° rotation of the smaller sprocket, permitting the lift arm to swing from a fully retracted position underneath the body of the truck to a fully extended position where the lift bar closes the gate.

13 Claims, 9 Drawing Figures

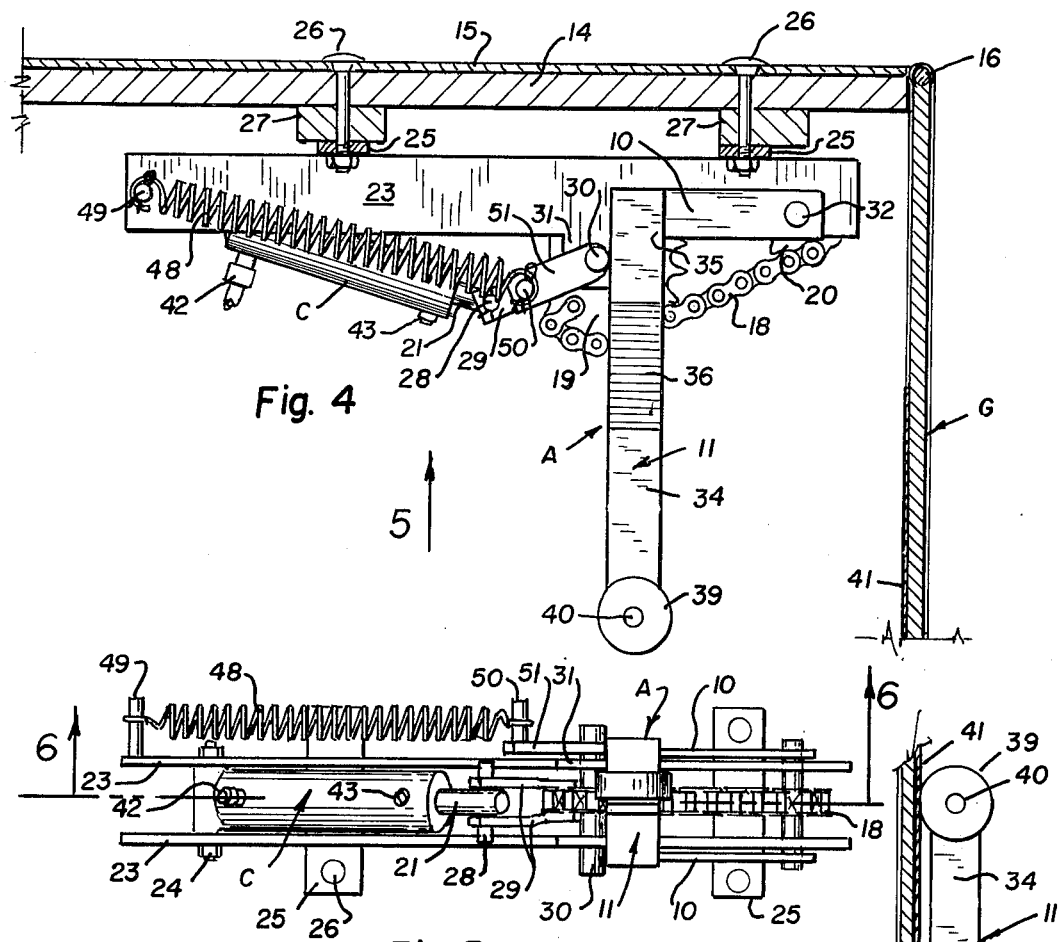
Fig. 4
Fig. 5
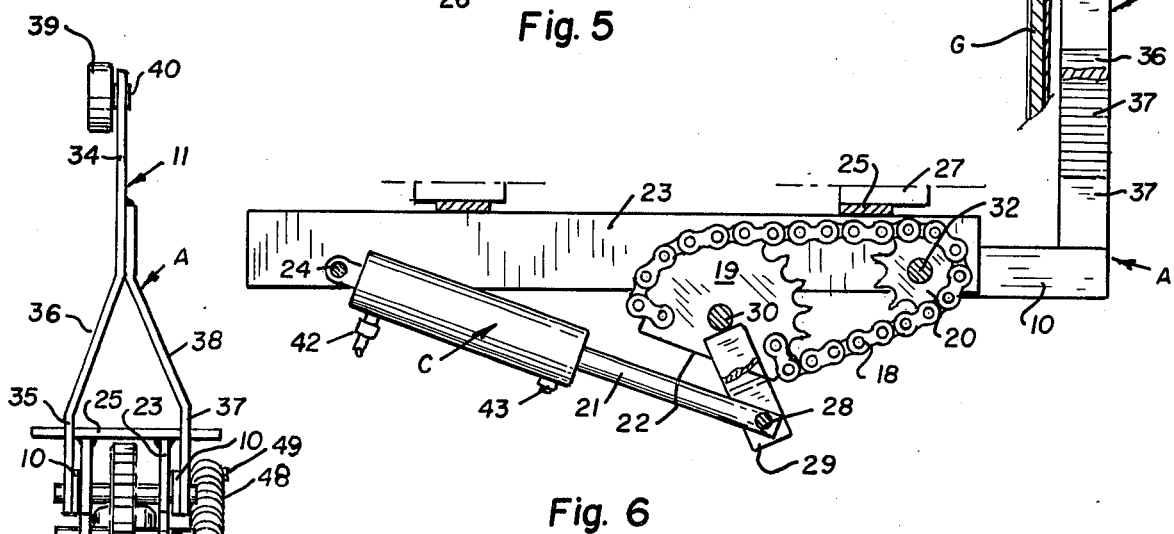
Fig. 6
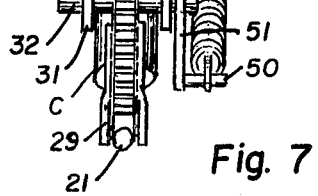
Fig. 7

LIFT FOR TRUCK GATE

This invention relates to a mechanism for lifting the gate of a truck or trailer of the type which is hinged at the bottom adjacent to the truck bed. This invention has particular utility in lifting the side gate of a truck or trailer and is hereinafter described with reference to side gates. However, it is to be understood that the invention may be also adapted to lift a similar end gate of a truck or trailer.

Truck and trailer bodies in which a side gate is pivoted outwardly and downwardly to open and then pivoted upwardly to close include two types. In one type, the gate opens to unload. In this type, the side gate is pivoted at the edge of the truck bed, being maintained in an upper position when carrying and holding a load, but pivoted downwardly in order to unload. Part of the load will flow from the truck when the gate is opened and the remainder of the load will be discharged by tilting the truck bed, that is moving the opposite side of the bed upwardly. In this instance, the side gate is latched prior to dumping and unlatched when it is to be opened to swing outwardly and downwardly, due to the weight of the material contained above the bed. Thus, after unloading and the bed is returned to its normal horizontal position, the side gate is pivoted upwardly about the hinge at the edge of the bed to again be closed and latched. This type of side gate is used on trucks and trailers adapted to carry grain, sugar beets and the like. This type of truck will be hereinafter called a beet truck, a common use thereof.

In another type of truck using a side gate, the purpose for the gate is for loading rather than unloading. A stationary panel extends upwardly from the side edge of the bed and the side gate is hinged at the top of the stationary panel, so that the side gate may be lowered while loading machines, as of the conveyor type, are depositing potatoes or a similar type of crop onto the bed. As soon as the potatoes or the like have reached an appropriate level, the side gate is moved upwardly and to a latched position, so that the additional space in the truck bed resulting from the raised side gate can then be filled by the loaders or conveyors. This dual loading is advantageous when the product may possibly be damaged by falling too great a distance in loading. As will be evident, loading over the stationary panel reduces the distance which the potatoes, for instance, will fall when being deposited on the truck bed. This type of truck will be hereinafter called a potato truck, a common use thereof.

Numerous types of mechanisms for lifting gates of trucks or trailers exist. However, as far as is known, no really satisfactory solution has been developed to the problem of lifting a side gate, which will swing through a 180° arc. In U.S. Pat. No. 3,773,385, a pneumatic or hydraulic cylinder extends or retracts a plunger in alignment with it. A link is pivoted to the end of the plunger and also to the rear side of a tailgate, but the lower portion of the tailgate must be inclined downwardly and forwardly. When the tailgate is moved downwardly, upon retraction of the cylinder, it can move only to an essentially horizontal position. In U.S. Pat. Nos. 2,261,099 and 2,850,187, a linkage mechanism is utilized with a fluid operated cylinder, but the linkage mechanism becomes quite complicated when the tailgate is to be pivoted through 180°.

Among the objects of this invention are to provide a mechanism for lifting bottom-hinged gates associated with the carrying bed of a truck or trailer which will easily move the gate through 180°; to provide such a mechanism which will swing out of the way when it is retracted and not in use; to provide such a mechanism which is simple and effective; to provide such a mechanism which is particularly useful with side gates of trucks or trailers hauling sugar beets and the like; and to provide such a mechanism which is particularly effective for lifting gates which are pivoted above a stationary panel, as on trucks and the like utilized for hauling potatoes and similar crops.

In essence, this invention includes an L-shaped arm having base bars disposed laterally from a lift bar, the base bars extending outwardly from an actuator mechanism beneath the bed to a position outside the bed, so that the extended end of the lift arm will engage a pivoted gate thereabove. Also, the lift arm may be retracted beneath the bed to position the arm in a depending storage position, spaced inwardly from the edge of the bed. Another feature of the invention is the utilization of the mechanical advantage possible with sprockets in the actuator. A larger sprocket pivotal through approximately 90° by a cylinder and piston rod chain-connects with a smaller sprocket attached to a pivot shaft carrying the base bars of the arm. The pitch diameter of the larger sprocket may be a multiple of the pitch diameter of the smaller sprocket, such as on the order of two to one, so that 90° movement of the larger sprocket will produce a necessary 180° movement of the smaller sprocket. As heretofore mentioned, this invention is not only useful for side gates, but is also adapted to be mounted on the underside of the truck bed, in order to move a bottom-hinged tailgate upwardly to a closed position after dumping has occurred.

Other features, as well as additional objects of the invention will become apparent from the following description, taken in conjunction with the accompanying drawings, in which:

FIG. 4 is a cross section showing a side elevation of the gate lift mechanism with the lift arm in retracted position, and the side gate in down or unloading position.

FIG. 5 is a bottom view of the gate lift mechanism, indicated by the arrow 5 of FIG. 4.

FIG. 6 is a cross section taken along line 6—6 of FIG. 5, but with the lift arm and side gate in an upper position.

FIG. 7 is an end view of the mechanism.

Figure 1:
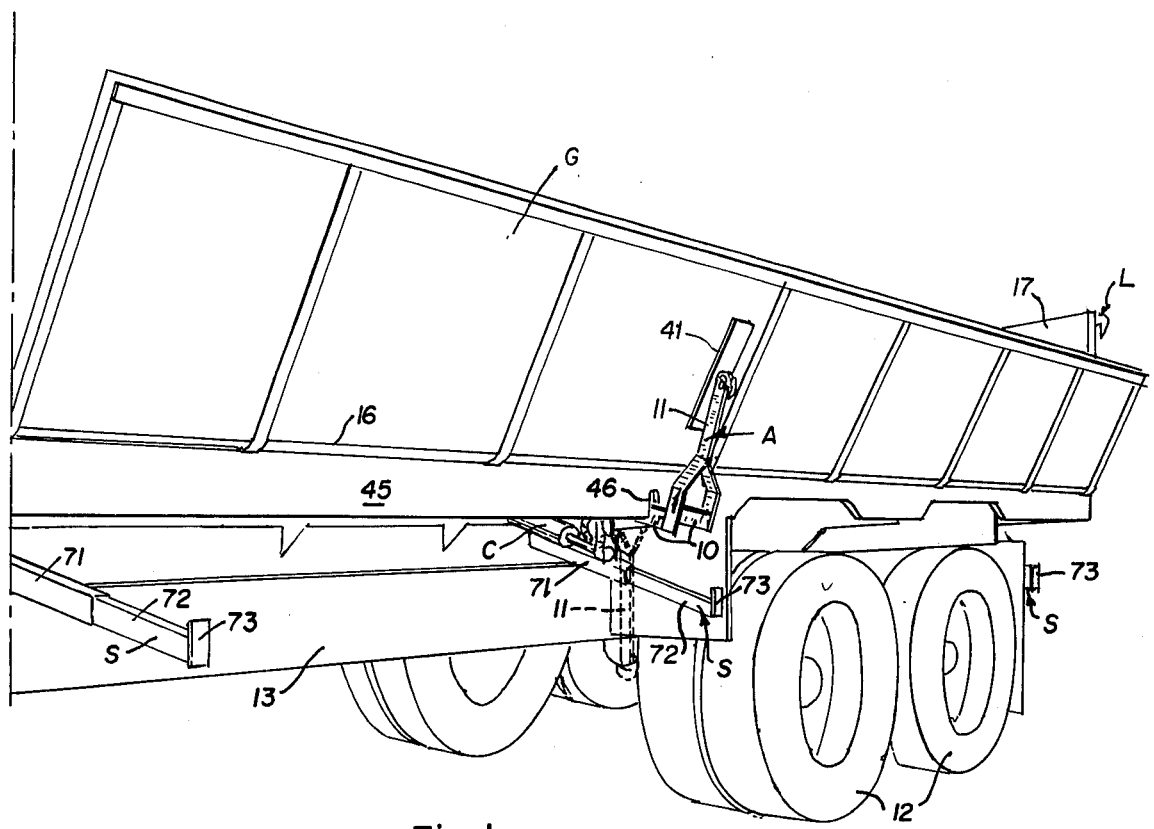
FIG. 1 is a three-quarter front perspective view showing a beet truck having a side gate and also an improved gate lift, the mechanism of this invention for lifting the side gate.
Figure 2:
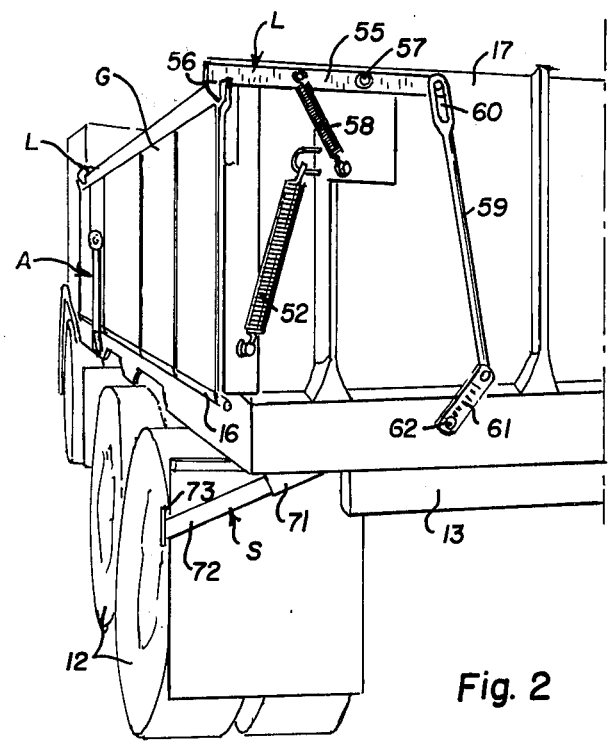
FIG. 2 is a three-quarter rear perspective view, showing the tailgate in closed position and latched.
Figure 3:
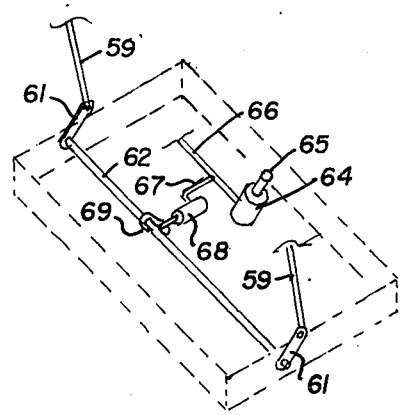
FIG. 3 is a diagrammatic perspective view of a fluid operated device for retracting the latch and a fluid operated device for tipping the bed for unloading at the side.

Referring first to FIGS. 1 to 7, the mechanism for lifting and closing the open gate of a beet truck, that is a gate G hinged at the truck bed according to the present invention, includes an angular lift arm A consisting of base bars 10 and an extended lift bar 11. The base bars 10 are pivotally mounted beneath the bed of the beet truck, while the lift arm A will normally hang in a downwardly extending storage position, shown in dotted lines in FIG. 1 and in full lines in FIG. 4. The lifting mechanism includes a cylinder C and associated parts to raise the gate G from its downward position of FIG. 4, through the angular position of FIG. 1 and then to the upright position of FIG. 6, thereby closing the gate G. After a side gate has been latched in its upper, closed position, by latches L of FIGS. 1 and 2, the arm A may be retracted to the storage position of FIG. 4 beneath the truck bed. At the storage position, the arm is out of the way of any object alongside the truck being passed by the truck or passing the truck.

The uses and advantages of a side gate G are numerous. For example, with a side gate G, a beet truck may be driven up a ramp and alongside a railway car to drop its load of beets therein. To unload, each latch L is unlatched, in a manner to be described later, to open the gate while the opposite side of the truck bed is being lifted to complete the discharge of the truck load. This unloading from the side avoids the necessity for backing up to the unloading station. After unloading, the truck drive will then promptly drive away from the unloading station in order to permit the next truck in line to unload. With the present invention he can immediately commence to raise the gate from controls in the cab. Prior to this invention, it would be some time before the operator could stop the truck at an appropriate location, dismount and manually elevate and close the side gate. The stopping of the truck, dismounting and closing the gate is a time consuming and sometimes difficult operation since the gate may be quite heavy. While the truck is being driven away from the unloading station, there may be a tendency for the side gate to bounce against the wheels 12 of the truck. This latter problem may be avoided by a series of stops S projecting outwardly from the truck frame 13 and slightly beyond the lateral distance of the tires.

The bed of the truck may include a floor 14, such as of wood, covered by a protective plate 15, as of metal. The gate G may pivot about a hinge 16 connecting the bed and the gate at the outer edge of the former. The latches L, one at the rear of the side gate G and the other at the front, are mounted on the end walls, such as the tail wall 17.

The mechanism of this invention which swings the lift arm A upwardly as the piston of the cylinder C is extended, includes a chain 18 engaging both a larger sprocket 19 and a smaller sprocket 20, spaced apart in a framework attached to the underside of the truck bed as hereinafter described. A piston rod 21 connects with the larger sprocket 19 and the larger sprocket is cut off at a chord 22, to prevent interference by the sprocket with movement of the piston rod 21 as it extends from the cylinder C to move the left arm A to its upward position, as in FIG. 6. This is permissible because the arc through which the sprocket rotates will be restricted as hereinafter explained. Also, it will be noted that the cylinder C and its position rod 21 are carried in the framework in alignment with the plane of the sprockets. This framework includes a pair of mounting plates 23 lying in spaced parallelism, transversely of the longitudinal truck axis. The sprockets 19 and 20 are mounted between these plates. Also, the base end of the cylinder C is pivotally mounted on a pin 24 between the mounting plates 23. The mounting plates 23 are maintained in their spaced, parallel relation by attachment, as by welding, to a pair of transverse bars 25, by which the mechanism may be mounted on the underside of the truck bed, as through bolts 26 extending through spacing blocks 27. The extended end of the piston rod 21 is pivotally connected to a pin 28 which extends between a pair of links 29 attached to and radially extending from opposite sides of the sprocket 19, again as by welding. The sprocket 19, in turn, is pivotally mounted by a shaft 30 which extends transversely to and through depending flanges 31 of the opposed plates 23. The smaller sprocket 20 is pivotally mounted by a shaft 32 which also extends transversely to and through the plates 23, with the base bars 10 lying at opposite sides of the plates 23 and being attached to side extensions of the shaft 32. The length of these base bars 10 is such that they will shift the lift bar 11 of the arm A against extensions of the shaft 30, such extensions forming abutments to limit the retracted position of the arm A.

The lift bar 11 of the arm A is forked, containing two bars welded together, one side bar 34 provided with an angular offset 35 and a central extending portion 36. The opposite side bar 37 is provided with an angular offset 38, together with an end portion attached, as by welding, to the central portion 36. A roller 39, for engaging and moving along the side gate G as it is engaged by the arm A, is pivoted on a pin 40 which is mounted at the extreme end of the lift bar 11 of arm A. Also, a striking plate 41 for engagement by roller 39 may be mounted on the gate G. It will be evident that the roller 39 prevents sliding friction from reducing the effective thrust of the end of the arm against the gate G.

The cylinder C is provided with a fluid connection 42 adjacent the end opposite the piston rod 21 to which fluid, under pressure, may be applied to cause the piston rod to extend from the retracted position of FIG. 4 to the extended position of FIG. 6. The piston rod may be retracted by supplying fluid to the opposite end of the cylinder, as through a connection 43, which is shown as plugged. However, the lift arm A, as shown, is retracted to its position of FIG. 4 by releasing the pressure within the end of cylinder C opposite the piston rod, in a manner described below. The placing of this mechanism for the retraction and extension of the piston rod 21 to lower and raise the lift arm A must be in a manner which permits clearance at all positions of the arm. For example, the bed of the truck may be provided with a depending side rail 45, in which a pair of slots 46, as in FIG. 1, are provided to accommodate the base bars 10 moving upwardly as the arm A is moving to its upright position of FIG. 6.

In order to pull the arm A back to its retracted position of FIG. 4, while the fluid pressure is permitted to bleed from the end of cylinder C, a spring 48 may engage, at one end, a stationary pin 49 extending from one of the plates 23, and at the opposite end, a pin 50 which extends laterally from a link 51, attached to pivot pin 34 of the larger sprocket. A spring 52, as in FIG. 2, at the rear of the truck, may also urge side gate G to an upright position, while a similar spring may be mounted at the front end of the truck body.

Each latch L includes an angular bar 55 having a bevelled hook 56 at its outer end for holding the gate G in an upright, closed position. The bar 55 is pivotally mounted on a bolt 57, while a spring 58 tends to hold the bar in a downward position. However, when the side gate G is lifted to its upper position, the top of the side gate will engage the bevel shown on the lower end of the hook to force the hook upwardly until gate G moves past the hook, whereupon the hook will be pulled back down by spring 58, to lock the gate in an upright closed position. Bar 55 is also connected with a rod 59 through a pin and slot arrangement 60, so that a pull by rod 59 on the rear end of the bar 55 will lift the hook 56 but upward movement of hook 56 is permitted when gate G is moved upwardly by arm A to move hook 56 upwardly as the gate moves beneath it. Rod 59 is pivoted at its bottom to a link 61, in turn connected to a shaft 62. As in FIG. 3, shaft 62 may extend within the space 63 beneath the bed of the truck or trailer to its front end for connection with a similar link 61 and rod 59, for release of the corresponding latch L at the front end of the bed. A cylinder 64, either single acting or telescoping, is utilized through extension of its piston rod 65 in tipping the bed of the trailer at the side opposite the side gate G, for unloading of the trailer. For this purpose, the bed is pivoted on the frame in a conventional manner and on the side opposite the point of attachment of piston rod 65 to the underside of the bed. A fluid line 66 transmits fluid under pressure to the cylinder 64, while a branch line 67 supplies fluid to a cylinder 68 whose piston rod is connected to a link 69 for pivoting rod 62. Thus, a forward thrust of the piston rod of cylinder 68 will move rod 59 in a direction to unlatch the latches. Through the branch line 67, the latches are unlatched at the same time that the bed is tipped upwardly at the opposite side. Thus, additional fluid controls are unnecessary. When the fluid pressure in line 66 and branch line 67 is released, the weight of the bed and its walls will force piston rod 65 downwardly until the hydraulic fluid has been pushed back to its source, usually a conventional tank. Also, such release of the pressure will permit the piston rod of cylinder 68 to return to its initial position through spring 58.

The stops S comprise fixed tubular outer bars 71 and adjustable tubular inner bars 72 extending laterally and slightly downwardly from the frame 11 of the truck. Each stop is provided at its outer end with a striking plate 73. Depending on the length of the bed, two or three stops S may be utilized, the purpose of the stops, as indicated previously, being to keep the gate, when down, from swinging against the tires.

Figure 8:
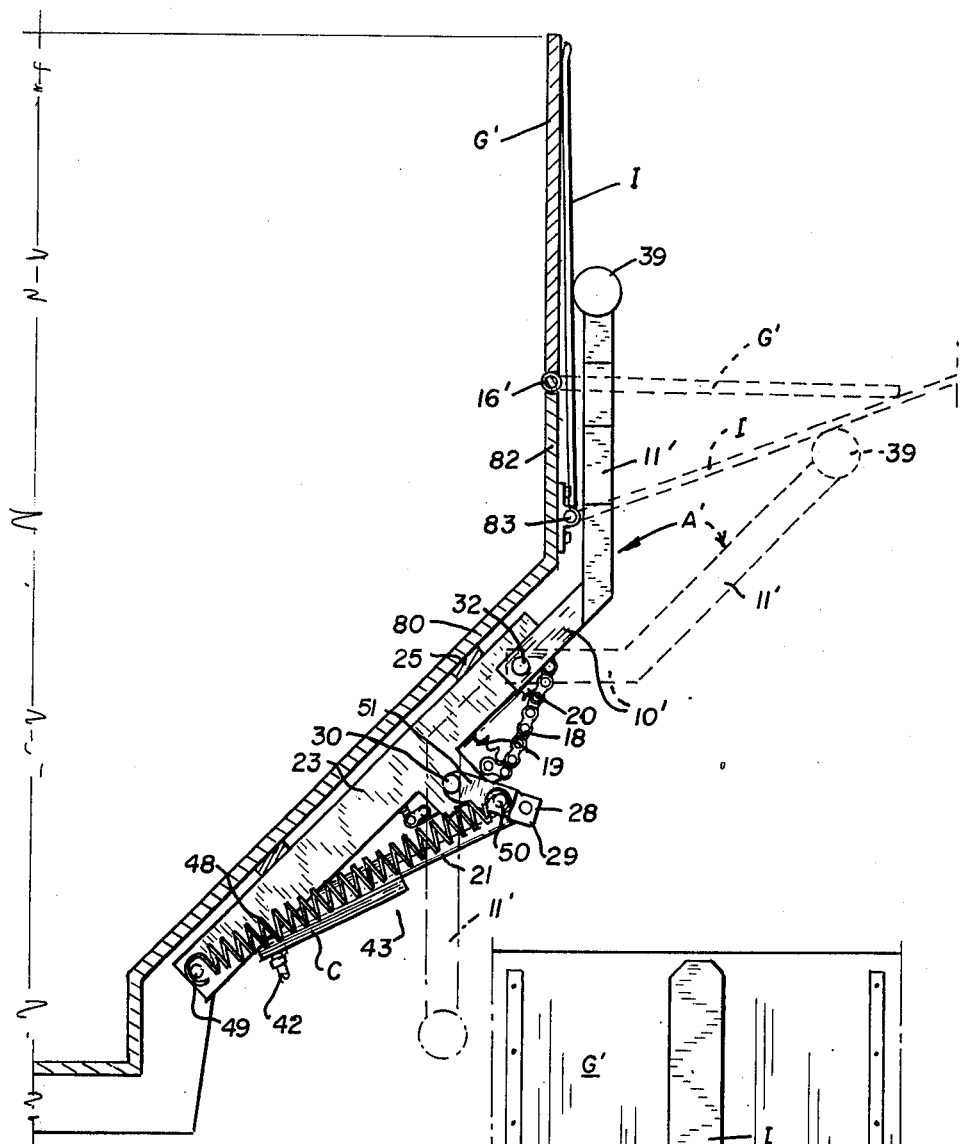
FIG. 8 is a cross section similar to FIG. 4 but showing a potato truck having a stationary, upright panel between the bed and the side gate, as well as an auxiliary arm between the lift arm and the gate.
Figure 9:
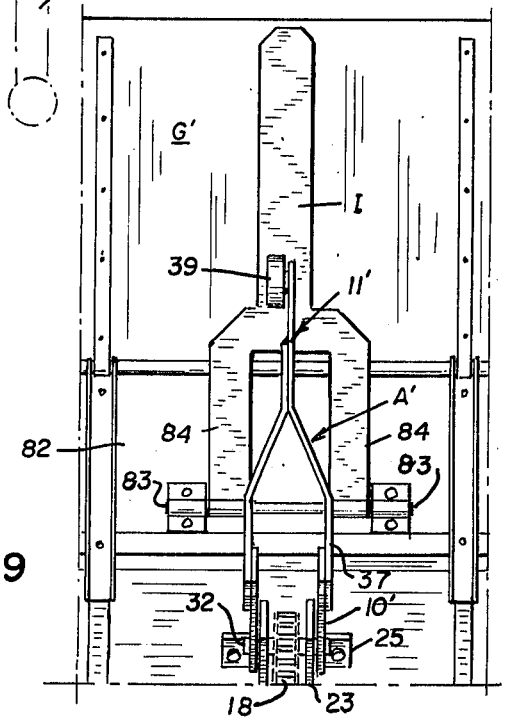
FIG. 9 is a fragmentary side elevation of the construction of FIG. 8, with both the gate and the lift arm in an upper position.

In the case of the potato truck of FIG. 8, a hopper type sloping bed 80 may be provided at each side with a conventional conveyor belt (not shown) operating in a trough 81 for unloading at the rear. Also, the gate G' is not pivoted at the edge of the bed, but at the top of an upright, stationary panel 82. The mechanism carrying the lift arm A', and the lift arm itself, are conveniently of the same proportions as that heretofore described for a beet truck and the mechanism carried by the mounting plates 23 must be placed underneath the sloping bed 80 as shown at FIG. 8. The length of the arm A' is thus limited and it cannot reach the gate G' at a point sufficiently above the gate hinge point 16' where good leverage is obtained. Moreover, when the arm A' is lowered and the gate is open, the roller 39 will overreach the lower edge of the open gate to cause the gate and lever to bind at the crotch between the base bars 10 and the lift bar 11. Thus, an intermediate arm I is interposed between the arm A' and the gate, as in the dotted position of FIG. 8 and is pivotally connected by a hinge 83 to panel 82. Legs 84 of arm I are spaced apart to reduce the stresses imposed. Thus, the arm A', and particularly the roller 39 thereof, will engage the intermediate arm I, when in the down position, and push the intermediate arm against the gate G'. As the lift arm A moves upwardly, the intermediate arm I will push the gate G' further upwardly until the gate is in an upright, closed position.

The lift assembly is similar in construction to that of FIGS. 1 to 7, but is mounted on the underside of the hopper wall 80 and is thus mounted at an angle, such as 45°, to the vertical. Thus, the base bars 10 of the lift arm A' extend at 45° to the remainder of the arm. As shown in FIG. 8, the angularity of base bars 9' permits the remainder of the arm to be swung to an upright position, shown in full, or a depending position beneath the truck bed, shown in dot dash lines.

In storage position, the arm A' hangs down on the underside of the bed, as before, while the intermediate arm I also hangs down, but at the outer edge of the bed. However, the thickness of the intermediate arm I is considerably less than that of the arm A, so that there is little or no difficulty in the side clearance.

Operation of the mechanism, in either embodiment, is obvious from the foregoing description. The pitch diameter of the larger sprocket is preferably twice that of the smaller sprocket 20. The arm A or A' and the small sprocket 20 must swing through a 180° arc to raise the gate from its lowered, open position to the upright, closed position. Thus, at the same time the rotation of the large sprocket 19 is only through a 90° arc. This latter rotation is easily attained by the thrust of the piston rod 21. The hydraulic system and the controls for obtaining this movement are entirely conventional and need not be further described.

While two different embodiments of this invention have been illustrated and described, it will be understood that other embodiments may exist and that various changes may be made, without departing from the spirit and scope of this invention.

What is claimed is:

1. A mechanism for lifting the hinged gate of a truck or trailer body and the like, comprising:
   an actuator means carried underneath the body of the truck alongside the gate;
   a lift arm pivotally mounted upon said actuator means below the hinge area of said gate, to be pivoted upwardly by the actuator means to move said gate from a lower open position to an upper closed position;
   said actuator means including:
   a smaller sprocket means connected to the pivotal mounting of said lift arm;
   a larger sprocket means connected with the smaller sprocket means having a greater pitch diameter than said smaller sprocket means; and
   thrust means for pivoting said larger sprocket means through a predetermined arc, thereby moving said smaller sprocket through a greater arc which is sufficient to move said lift arm from underneath the body of the truck into engagement with said gate and thence moving said gate upwardly to an upper closed position.

2. A mechanism as defined in claim 1, wherein:
   said thrust means comprises a fluid cylinder and piston rod crank-connected with said larger sprocket means.

3. A mechanism as defined in claim 2, wherein:

said crank connection of said piston rod is below the horizontal center line of said larger sprocket means.

4. A mechanism as defined in claim 2, wherein:
fluid under pressure is supplied to the end of said cylinder opposite said piston rod to cause said arm to move said gate upwardly;
said fluid pressure is released to permit said arm to move upwardly; and
resilient means assists in moving said arm downwardly.

5. A mechanism as defined in claim 2, wherein:
said cylinder is provided with means for receiving fluid under pressure at each end thereof.

6. A mechanism as defined in claim 1, wherein said lift arm is L-shaped and includes:
a base bar attached to the pivotal mounting at said actuator means; and
a lift bar angularly extending from the base bar, the proportions thereof being generally such that the base bar will swing to an extended position a short distance beyond the edge of the truck with the lift bar being extended upwardly to the gate closing position.

7. The mechanism defined in claim 6, wherein:
the angular configuration of the lift arm is approximately 90°.

8. The mechanism defined in claim 6, wherein:
the angular configuration of the lift arm is obtuse.

9. A mechanism as defined in claim 6 wherein:
said gate is hinged above said bed at the upper edge of an upright panel attached to said bed; and
an intermediate arm is pivoted on said panel for engagement with said gate and by said lift arm in lifting said side gate.

10. A mechanism as defined in claim 9, including:
resilient means for moving said arm downwardly to a lower position;
resilient means for moving said latch to a gate engaging position; and
the pressure of fluid in said end of each said cylinder is released to permit said gate to move downwardly and said latch to move to its gate engaging position.

11. A mechanism as defined in claim 1, wherein:
said sprocket means are chain connected.

12. A mechanism as defined in claim 1, including:
latch means for holding said gate in an upper position; and
a second thrust means for moving said latch means to release said gate and permit downward movement of said gate.

13. A mechanism as defined in claim 12, wherein:
each of said thrust means comprises a cylinder and piston rod; and
each cylinder is supplied with fluid under pressure to the end opposite said piston rod to cause the respective piston rod to extend said gate to move upwardly and said latch to be released, respectively.

* * * * *